April 1, 1924.
W. T. JOHNSTON
TRUCK
Filed Feb. 18, 1918        2 Sheets-Sheet 1
1,488,882
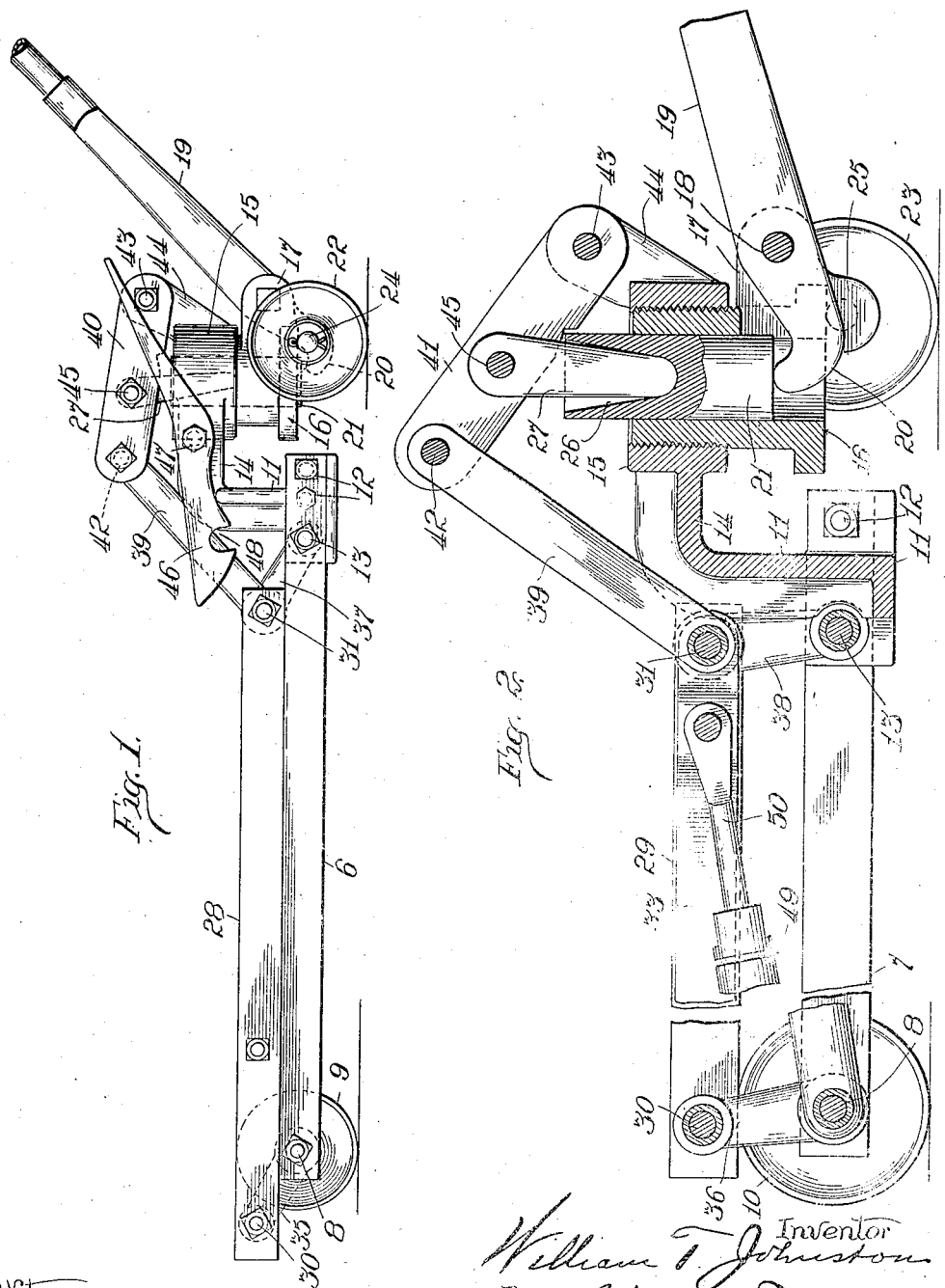

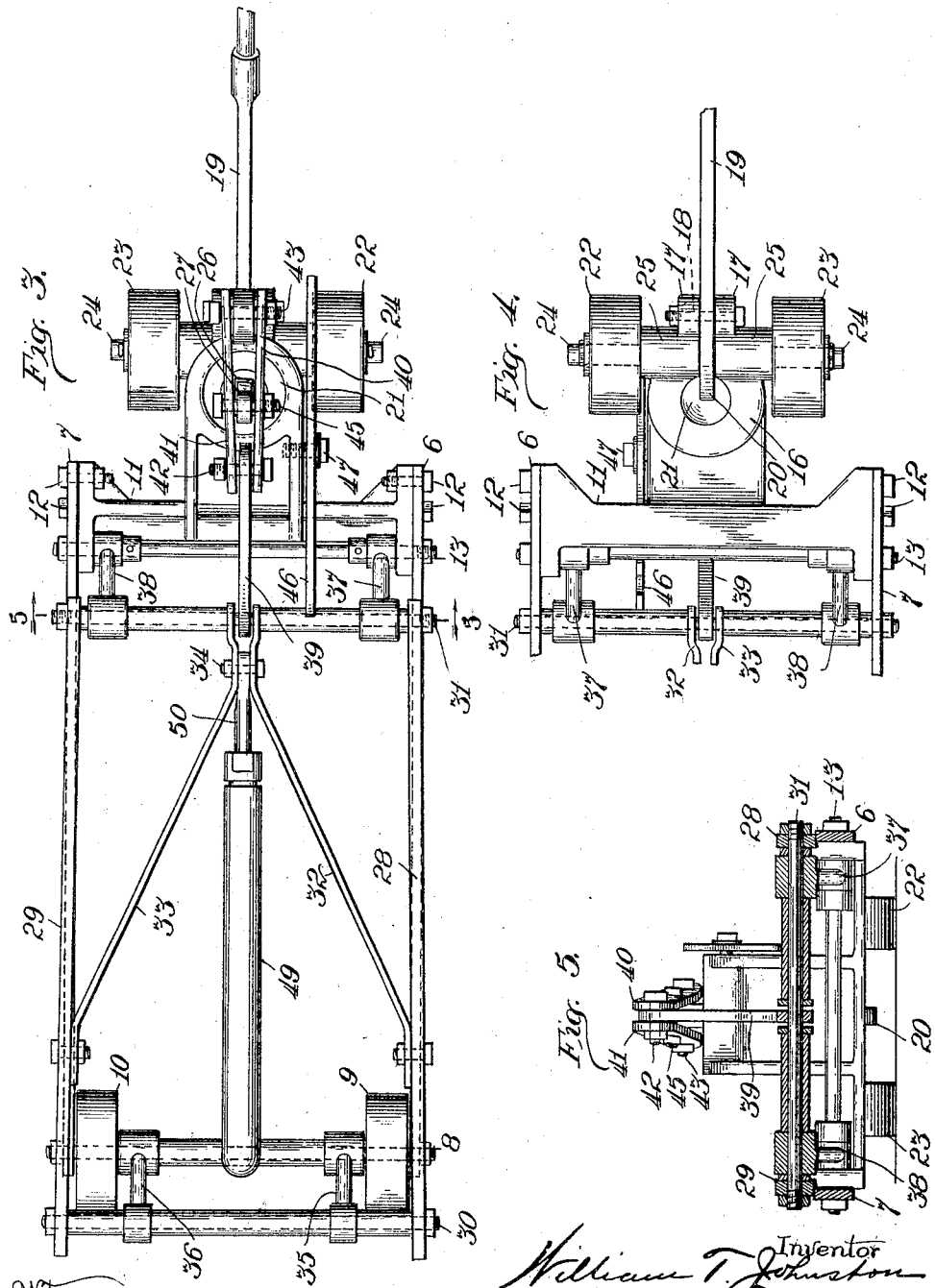

Patented Apr. 1, 1924.

1,488,882

UNITED STATES PATENT OFFICE.

WILLIAM T. JOHNSTON, OF NEWPORT, KENTUCKY, ASSIGNOR TO ARTHUR M. BARRETT, OF WINNETKA, ILLINOIS.

TRUCK.

Application filed February 13, 1918. Serial No. 217,817.

*To all whom it may concern:*

Be it known that I, WILLIAM T. JOHNSTON, a citizen of the United States, and a resident of Newport, in the county of Campbell, State of Kentucky, have invented certain new and useful Improvements in Trucks, of which the following is a specification, reference being had to the accompanying drawings.

My invention relates to trucks of the type known as elevating trucks designed to be used for moving more or less heavy loads from one point to another in factories, warehouses, &c. Such trucks are characterized by the fact that they comprise a dirigible main frame supported on wheels and a rising and falling lifting frame carried by the main frame in such manner that when the lifting frame is in its lowermost position the truck may be introduced under a suitable platform on which the load is piled, after which, by elevating the lifting frame, the platform with its load can be lifted off the floor and be carried to the desired location on the truck and there deposited by reversing the movement of the lifting frame. The object of my invention is to provide a strong, simple and efficient truck of this type, and my invention consists in the improved combination and arrangement of the members of the truck illustrated in the drawings and hereinafter specifically pointed out.

In the accompanying drawings:

Fig. 1 is a side elevation of my improved truck, showing the lifting frame in its lowermost position;

Fig. 2 is substantially a central longitudinal vertical section showing the lifting frame in its elevated position;

Fig. 3 is a plan view of the truck as shown in Fig. 1;

Fig. 4 is an underside view of the forward portion of the truck; and

Fig. 5 is a vertical cross-section on line 5—5 of Fig. 3.

The main frame of my improved truck comprises side bars 6—7 which at the rear are connected by a transverse shaft 8 on which are mounted the rear wheels 9—10, said wheels being disposed between and adjacent to the side bars 6—7, respectively, as shown in Fig. 3. At their front ends said side bars are connected by a crosshead 11 which may be connected thereto by bolts 12 or other suitable means. Adjacent to the cross-head 11 is a transverse rod or shaft 13 which is secured to the side bars 6—7 a short distance back of said crosshead, as shown in Figs. 2 and 3.

As best shown in Fig. 2, the cross-head 11 is provided centrally with an upwardly and forwardly extending neck 14 which terminates in an internally screw threaded cylindrical bearing 15, the axis of which is disposed vertically. 16 indicates a steering head which is cylindrical in form and is externally screw-threaded to fit in the bearing 15. Said steering head is provided with forwardly-projecting lugs 17 near its lower end, which carry a pivot or fulcrum 18 on which is mounted a lever 19 which serves not only as a lever for raising and lowering the lifting frame, but also as a steering rod for steering the front wheels. As clearly shown in Fig. 2, said lever is fulcrumed near its lower end 20, which is rounded and curved upward and is arranged to project into the bore of the steering head 16 at the lower end portion thereof. 21 indicates a plunger mounted in the bore of the steering head 16 and adapted to move longitudinally therein, its lower end resting on the end 20 of the lever 19, as shown in Fig. 2. By this construction it will be apparent that by raising the outer end of the lever 19 the plunger 21 will be permitted to descend and that by depressing the outer end of said lever the plunger 21 may be forced upward. 22—23 indicate the front wheels of the truck, which are mounted on a short transverse shaft 24 journaled in lugs 25 provided at the lower forward portion of the steering head 16, as shown in Figs. 2 and 4. Thus, by swinging the lever 19 to one side of the other, the front wheels may be turned in either direction to steer the truck. This operation also rotates the steering head 16 in the bearing 15, and consequently causes a slight vertical movement of the forward end of the main frame owing to the screwthreaded connection between the steering head 16 and the bearing 15, but as the pitch of said screw-threads may be made very slight such vertical movement, if desired, may be negligible. The advantage of providing such screw-threads is that they provide a convenient means of connecting the steering head with the cross-head of the main frame and holding such parts in proper operative relation to each other.

As best shown in Fig. 2, the plunger 21 is provided at its upper end with a conical socket 26 in which is mounted a rocking thrust bar 27, the lower end of which bears in the bottom of said socket as shown. By using a conical socket, as described, a plunger which is not cylindrical may, if desired, be employed. The function of this thrust bar will be hereinafter set forth.

28—29 indicate the side bars of the lifting frame, which, at their rear ends, are connected by a transverse shaft 30 and at their forward ends are connected by a transverse shaft 31, as shown in Fig. 3. They are also connected by diagonal braces 32—33, the rear ends of which are connected to the rear portions of the side bars 28—29 and the forward ends of which are connected to the central portion of the shaft 31. These braces are also connected together near their forward ends by a bolt 34, as shown in Fig. 3. The lifting frame is movably supported upon the main frame at the rear by swinging arms 35—36, which connect the shafts 8 and 30, and at the front by similar arms 37—38, which connect the shafts 13 and 31. The arrangement is such that when the lifting frame is in its lowermost position the several arms 35—36—37—38 will occupy an inclined position, as shown in Fig. 1, their upper ends lying back of their lower ends. When the lifting frame is drawn forward, said arms will swing in a clockwise direction, viewed in the illustration of Fig. 1, until said arms assume approximately the position shown in Fig. 2, so that the lifting frame is raised as it moves forward. For the purpose of drawing the lifting frame forward to elevate it in the manner described in the embodiment of my invention illustrated, I employ a toggle comprising a link 39, and a pair of links 40—41. The link 39 is pivoted at one end on the central portion of the shaft 31 carried by the lifting frame, as shown in Figs. 2 and 3, and is connected with the rear ends of the links 40—41 by a pivot 42, as shown in Fig. 2. The forward ends of the links 40—41 are mounted upon a pivot 43 mounted in a lug 44 carried at the forward side of the bearing 15 of the main frame, as shown in Fig. 2 so that the toggle mechanism extends over the thrust bar 27 and is connected with the main and lifting frames respectively at opposite sides thereof and of the axis of the steering member. The links 40—41 are also pivoted intermediately to the upper end portion of the thrust bar 27 by a pivot 45, the thrust bar extending between said links, as shown in Fig. 3.

From the foregoing description it will be seen that when the plunger 21 is moved upward by depressing the forward end of the lever 19, the toggle connecting the main and lifting frames will be deflected intermediately, the rear ends of the links 40—41 being moved upward toward the position shown in Fig. 2, thereby exerting a forward and upward pull upon the lifting frame through the link 39. When the steering lever is moved in the opposite direction, the plunger 21 will descend, thereby lowering the lifting frame. It will also be apparent that the front wheels of the truck may at all times be turned in steering the truck without regard to whether the lifting frame is in its raised, its lowered, or any intermediate position, and that the operator has at all times full control of the load through the steering lever 19 without regard to the position of the steering wheels. It is therefore unnecessary to turn the steering wheels into a position parallel with the rear wheels when the lifting frame is to be raised, as is the case with many trucks of earlier design and construction.

For the purpose of locking the lifting frame in its elevated position I provide a latch lever 46, which is pivoted between its ends upon a suitable support, preferably the upper portion of the neck 14, by a pivot 47, and is provided at its rear end with a notch 48 adapted to extend over and engage the cross-shaft 31 when the lifting frame is in its elevated position. The rear end of said latch lever is rounded or beveled, as shown in Fig. 1, so that as the lifting frame rises the shaft 31 strikes such beveled portion and automatically lifts the latch, and when the lifting frame reaches its highest position the shaft 31 automatically enters the notch 48 and prevents said lifting frame from descending by holding it against rearward movement.

For the purpose of easing the descent of the lifting frame when released from the latch 46, I provide a cushioning device in the form of a fluid or other suitable check 49, which at its rear end is pivoted upon the central portion of the cross-shaft 8 and at its forward end is provided with a piston rod 50, the forward end of which is pivoted upon the bolt 34 between the braces 32 and 33, as shown in Fig. 3. Obviously, since the rear end of the check 49 is connected with the shaft 8 which is a part of the stationary frame, and the piston rod 50 is connected with the lifting frame by the bolt 34, when the lifting frame is elevated the piston rod 30 will be drawn out, moving the piston toward the forward end of the check. When the lifting frame is released from the latch 46 and begins to descend the piston 50 will be forced back, bringing the check into operation so that the descent of the lifting frame will be retarded and cushioned. If desired, the check used may be of the type provided with a spring, such as are commonly provided in door checks, to initiate the downward movement of the lifting frame.

I have described with great particularity the embodiment of my invention illustrated in the accompanying drawings, but it will be evident that the construction illustrated is subject to modification in many nonessential respects, and, therefore, I do not limit myself to the specific construction shown and described except in so far as it is particularly claimed, my invention including generically the subject-matter of the broader claims.

What I claim as my invention and desire to secure by Letters Patent, is—

1. A lifting truck comprising a main frame, an upwardly movable lifting frame, a rotatable steering member, a thrust member associated with said steering member, means for actuating said thrust member, and means connected with the main and lifting frames at opposite sides of the axis of the steering member and arranged to be deflected by said thrust member to raise the lifting frame.

2. A lifting truck comprising a main frame, an upwardly movable lifting frame, a rotatable steering member having a central opening, an upwardly movable member operating in said opening, means for moving said member upward, and means connected with the main and lifting frames at opposite sides of said opening and arranged to be deflected by upward movement of said member to raise the lifting frame.

3. A lifting truck, comprising a main frame, an endwise movable lifting frame, supporting and steering wheels, a steering head rotatably connected with said main frame, a plunger mounted in said steering head, means connected with said main and lifting frames and adapted to be deflected by said plunger to move said lifting frame endwise, and means mounted on said steering head and adapted to be operated to project said plunger.

4. A lifting truck, comprising main and lifting frames, a steering member rotatably associated with said main frame, a lever connected with said steering member, reciprocating means movable longitudinally in said steering member coaxially therewith and adapted to be actuated by said lever, and means connected with said main and lifting frames and extending over and actuated by said reciprocating means for raising said lifting frame.

5. A lifting truck comprising a main frame, an upwardly movable lifting frame, a rotatable steering member having a central opening, an upwardly movable member operating in said opening, means connected with the main and lifting frames at opposite sides of said opening and arranged to be deflected by upward movement of said member to raise the lifting frame, and a steering lever associated with said steering member and adapted to operate from any steering position to move said member upward.

6. A lifting truck, comprising main and lifting frames, supporting and steering wheels, an internally screw-threaded bearing carried by said main frame, a cylindrical screw-threaded steering head fitted in said bearing, a cylindrical plunger mounted in said steering head, means cooperating with said plunger for raising said lifting frame, and a lever mounted on said steering head and adapted to be operated to project said plunger.

7. A lifting truck, comprising main and lifting frames, supporting and steering wheels, a steering member rotatably associated with said main frame and having a cylindrical bore, a cylindrical plunger mounted in said steering member, toggle mechanism cooperating with said plunger to raise the lifting frame, and a lever mounted on said steering member and extending under said plunger, whereby by operating said lever said plunger may be projected.

8. A lifting truck, comprising main and lifting frames, supporting and steering wheels, an internally screw-threaded bearing carried by said main frame, a cylindrical screw-threaded steering head fitted in said bearing, a cylindrical plunger mounted in said steering head, toggle mechanism co-operating with said plunger for raising said lifting frame, and a lever mounted on said steering head and adapted to be operated to project said plunger.

9. A lifting truck, comprising main and lifting frames, supporting and steering wheels, a steering member rotatably associated with said main frame and having a cylindrical bore, a cylindrical plunger mounted in said steering member, a thrust bar mounted on said plunger, means actuated by said thrust bar for raising the lifting frame, and a lever mounted on said steering member and extending under said plunger whereby by operating said lever said plunger may be projected.

10. A lifting truck, comprising main and lifting frames, supporting and steering wheels, an internally screw-threaded bearing caried by said main frame, a cylindrical screw-threaded steering head fitted in said bearing, a cylindrical plunger mounted in said steering head, a thrust bar mounted on said plunger, means actuated by said thrust bar for raising the lifting frames, and a lever mounted on said steering head and adapted to be operated to project said plunger.

11. A lifting truck, comprising main and lifting frames, supporting and steering wheels, a steering member rotatably associated with said main frame and having a cylindrical bore, a cylindrical plunger mounted in said steering member, a thrust bar mounted on said plunger, toggle mechanism actuated by said thrust bar for raising the lifting frame, and a lever mounted on said steering member and extending under said plunger, whereby by operating said lever said plunger may be projected.

12. A lifting truck, comprising main and lifting frames, supporting and steering wheels, an internally screw-threaded bearing carried by said main frame, a cylindrical screw-threaded steering head fitted in said bearing, a cylindrical plunger mounted in said steering head, a thrust bar mounted on said plunger, toggle mechanism actuated by said thrust bar for raising the lifting frame, and a lever mounted on said steering head and adapted to be operated to project said plunger.

13. A lifting truck, comprising main and lifting frames, supporting and steering wheels, a steering member rotatably associated with said main frame, a lever connected with said steering member, a toggle connected with said main and lifting frames, and a plunger actuated by said lever in any steering position thereof for operating said toggle to raise said lifting frame.

14. A lifting truck, comprising main and lifting frames, supporting and steering wheels, a steering member rotatably associated with said main frame, a lever connected with said steering member, a toggle connected with said main and lifting frames, and a plunger actuated by said lever in any steering position thereof for operating said toggle to raise said lifting frame, said lever being arranged to swing laterally independently of said toggle mechanism.

15. A lifting truck, comprising main and lifting frames, supporting and steering wheels, a screw-threaded bearing carried by said main frame, a steering member threaded to fit said bearing, a handle connected with said steering member, and means operated by said handle for raising said lifting frame.

16. A lifting truck, comprising main and lifting frames, supporting and steering wheels, a screw-threaded bearing carried by said main frame, a steering member threaded to fit said bearing, a handle connected with said steering member, and means mounted in said steering member and operated by said handle for raising said lifting frame.

17. A lifting truck, comprising a main frame, supporting and steering wheels, an endwise movable lifting frame, swinging links connecting said lifting frame with said main frame, a steering member rotatably associated with said main frame, a lever connected with said steering member, reciprocating means co-axially arranged with reference to said steering member, said lever extending under said reciprocating means whereby the latter is adapted to be projected by the operation of said lever, and means cooperating with said reciprocating means for moving said lifting frame endwise to lift the same.

18. A lifting truck, comprising a main frame, supporting and steering wheels, a lifting frame, swinging links connecting said lifting frame with said main frame, a steering member rotatably associated with said main frame, a lever connected with said steering member, reciprocating means co-axially arranged with reference to said steering member and adapted to be projected by the operation of said lever, and toggle mechanism cooperating with said reciprocating means for raising said lifting frame.

19. A lifting truck, comprising a main frame, supporting and steering wheels, a lifting frame, swinging links connecting said lifting frame with said main frame, a rotary steering member having a tubular bore, a plunger mounted in said bore, a lever connected with said steering member and adapted to be operated to project said plunger, a thrust bar carried by said plunger, a link connected with said thrust bar and pivotally connected with said main frame, and a link connected with said first-mentioned link and with said lifting frame.

20. A lifting truck, comprising main and lifting frames, a steering member rotatably associated with said main frame, a plunger mounted in said steering member and having a conical socket, a thrust bar mounted in said socket, means actuated by said thrust bar for lifting the lifting frame, and a lever for actuating said plunger.

21. A lifting truck, comprising main and lifting frames, a steering member rotatably associated with said main frame, a plunger mounted in said steering member and having a conical socket, a thrust bar mounted in said socket, toggle mechanism actuated by said thrust bar for lifting the lifting frame, and a lever for actuating said plunger.

22. A lifting truck comprising a main frame, an upwardly movable lifting frame, a rotatable steering member, reciprocating means associated with said steering member, a toggle connected with the main and lifting frames and extending over said steering member to be actuated by said reciprocating means to raise the lifting frame, and means for actuating said reciprocating means.

23. A lifting truck comprising a main frame, an upwardly movable lifting frame, a rotatable steering member, reciprocating means associated with said steering member, a toggle connected with the main and lifting frames and extending over said reciprocating means to be actuated thereby to raise the lifting frame, and a steering lever arranged to actuate said reciprocating means regardless of its steering position.

24. A lifting truck comprising a main frame, an upwardly movable lifting frame, a steering member rotatably associated with said main frame and having a vertically disposed opening therein, a thrust member movable in said opening, means connected with the main and lifting frames at opposite sides of said thrust member and adapted to be deflected thereby to raise the lifting frame, and means for actuating said thrust member.

25. A lifting truck comprising a main frame, an upwardly movable lifting frame, a steering member rotatably associated with said main frame and having a vertically disposed opening therein, a thrust member movable in said opening, means connected with the main and lifting frames at opposite sides of said thrust member and adapted to be deflected thereby to raise the lifting frame, and a steering lever operable from any steering position to actuate said thrust member.

26. A lifting truck comprising a main frame, an upwardly movable lifting frame, a rotatable steering member, reciprocating means carried by said steering member, toggle mechanism connected with said main and lifting frames and adapted to be engaged and deflected by said reciprocating means to raise the lifting frame, and means operable from any steering position for actuating said reciprocating means.

27. A lifting truck comprising a main frame, an upwardly movable lifting frame, a rotatable steering member, a rocking thrust member mounted on said steering member and movable vertically, toggle mechanism connected with said main and lifting frames and adapted to be engaged and deflected by said rocking thrust member to raise the lifting frame, and means for actuating said rocking thrust member.

28. A lifting truck, comprising main and lifting frames, a steering member pivotally connected with said main frame, a plunger mounted on said steering member, means actuated by said plunger for raising the lifting frame, and a steering lever mounted on said steering member and extending under said plunger for actuating the same regardless of the steering position of said lever.

29. A lifting truck, comprising main and lifting frames, a steering member pivotally connected with said main frame, a plunger mounted on said steering member, toggle mechanism actuated by said plunger for raising the lifting frame, and a lever mounted on said steering member and extending under said plunger for actuating the same.

WM. T. JOHNSTON.